SYNCHRONIZATION SYSTEM FOR CLOCKS
Filed April 13, 1956
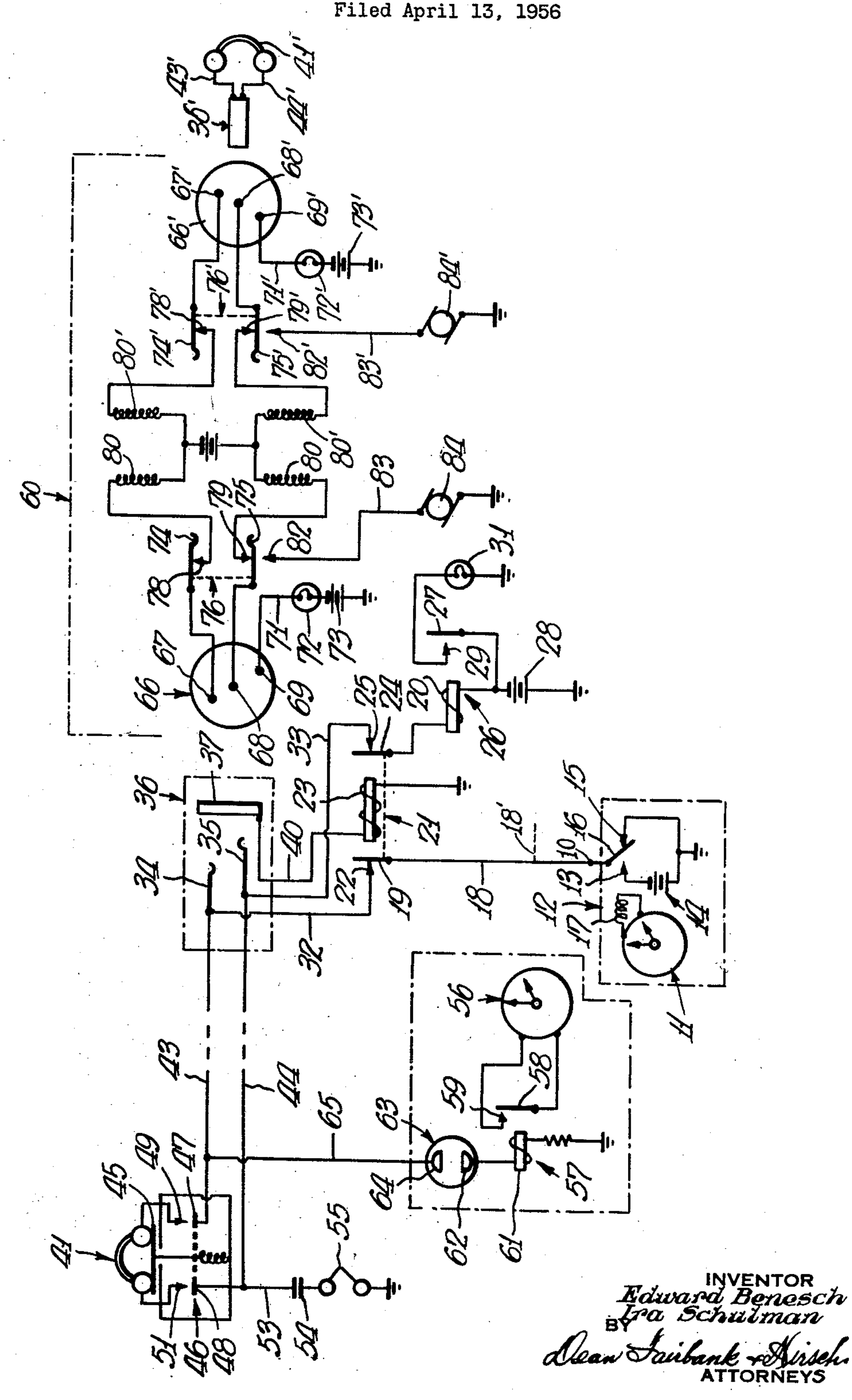
INVENTOR
Edward Benesch
Ira Schulman
BY
Dean Fairbank & Hirsch
ATTORNEYS

United States Patent Office 2,816,166

Patented Dec. 10, 1957

2,816,166

SYNCHRONIZATION SYSTEM FOR CLOCKS

Edward J. Benesch, Astoria, N. Y., and Ira Schulman, North Arlington, N. J., assignors to Self Winding Clock Company, Inc., New York, N. Y., a corporation of Delaware Application April 13, 1956, Serial No. 578,104

5 Claims. (Cl. 179—2)

This invention relates to the art of clock synchronization, more particularly of the type using telephone circuits as the conduit for the synchronization signals.

It is among the objects of the invention to provide a system for synchronizing clocks at a subscriber's station by impulses transmitted from a master clock at a telephone central station through a conventional telephone circuit, which requires substantially no modification of the existing telephone equipment other than the simple addition of low cost synchronizing equipment thereto and which does not change the characteristics of the telephone circuit by causing grounding of the lines at the subscriber's station which would interfere with trouble shooting for any faults in the telephone circuit and which does not cause the flow of ringing current through the earpiece of the telephone handset at the subscriber's station which would cause annoying noise and possibly damage to the instrument.

According to the invention, these objects are accomplished by the arrangement and combination of elements hereinafter described and particularly recited in the claims.

In the accompanying drawings in which is shown one of various possible embodiments of the several features of the invention, the single figure is a circuit diagram of the synchronization system.

Referring now to the drawings, a master clock 11 of conventional type is provided at the telephone central station which controls a relay 12 of the single pole double throw type. Fixed contact 13 of the relay 12 is connected to one side of a souce of potential, illustratively a battery 14, the other side of which is connected to ground and to fixed contact 15 which is normally engaged by contact arm 16 when the coil 17 of the relay 12 is not energized.

Contact arm 16 is connected to a terminal 10 which is connected by lead 18 to the contact arm 19 of cut-off relay 21 at the telephone central station, said contact arm normally engaging fixed contact 22 when the coil 23 of the relay is de-energized. The relay 21 has a second contact arm 24 ganged with contact arm 19 and normally engaging fixed contact 25. Contact arm 24 is connected to one end of the coil 20 of line relay 26, the other end of which is connected to contact arm 27 of relay 26 and to one side of a source of potential, illustratively a battery 28, the other side of which is connected to ground.

Contact arm 27 of relay 26 is normally spaced from a fixed contact 29 when relay 26 is not energized, and said fixed contact is connected through subscriber's line lamp 31 to ground.

The fixed contacts 22 and 25 of relay 21 are connected respectively by leads 32, 33 to contacts 34 and 35 which are illustratively shown as part of a jack 36 in the case of a manual telephone exchange. The jack 36 has an additional contact 37, illustratively the jack sleeve which is connected by lead 40 to one end of the coil 23 of relay 21, the other end of which is connected to ground. It is to be understood that in the case of an automatic exchange, the contacts 34, 35, 37 would be corresponding contacts of a conventioinal telephone line finder.

The contacts 34 and 35 of the jack 36 are connected by lines 43, 44 respectively, from the central station to the handset 41 of a conventional telephone at a subscriber's station, which may have a cradle with a switch bar 45 on which the telephone handset 41 normally rests and which controls a double pole single throw switch 46, the contact arms 47, 48 of which are normally spaced from associated fixed contacts 49, 51 when the telephone is not in use. The lines 43 and 44 are connected respectively to contact arms 47, 48 and the fixed contacts 49, 51 are connected to the telephone handset 41 in conventional manner. The line 44 is also connected by lead 53 through a condenser 54 to one side of a conventional ringer 55, the other side of which is connected to ground.

The secondary clock 56 to be synchronized, which is positioned at the telephone subscriber's location, has conventional synchronization mechanism such as an internal solenoid (not shown) controlled by a relay 57 illustratively having a contact arm 58 normally spaced from fixed contact 59. One end of the coil 61 of relay 57 is connected to ground and the other end to one of the electrodes 62 of a gas tube 63, the other electrode 64 of which is connected by lead 65 to lead 43.

The telephone central station has a talking circuit 60 including a plug 66 with three contacts 67, 68 and 69, which, in the case of an automatic exchange, would form part of a conventional switching unit. The contact 69 is connected by lead 71 through supervisory lamp 72 to one side of a battery 73, the other side of which is connected to ground. The contacts 67 and 68 are connected respectively to the ganged contact arms 74, 75 of a switch 76 in the central station, which normally engage fixed contacts 78, 79. The contact arm 75 is normally spaced from fixed contact 82 connected by lead 83 to a ringing generator 84 and the fixed contacts 78, 79 are connected through coils 80 and 80′ to the fixed contacts 78′, 79′ of a switch 76′, which normally engage ganged contact arms 74′, 75′ connected to fixed contacts 67′ and 68′ of a jack 66′, the contact 69′ of which is connected by lead 71′ through supervisory lamp 72′ to one side of a battery 73′, the other side of which is connected to ground. The contact arm 75′ is normally spaced from fixed contact 82′ connected by lead 83′ to a ringing generator 84′.

The handset 41′ of the telephone of a second subscriber is connected to a jack 36′ through circuits identical to those associated with jack 36, and the jack 36′ has circuitry identical to that associated with jack 36, a line 18′ connecting terminal 10 of the master clock at the central station to the relay 21 (not shown) associated with the second subscriber.

As the circuitry and components of the telephone system per se are conventional and the invention resides in the synchronization system and the manner in which it is connected to the conventional telephone system, no further description of the latter is deemed neccessary.

In the operation of the system, assuming that the master clock 11 is set to deliver a synchronization impulse every hour, at such time the relay 12 will be automatically energized to cause the contact arm 16 to move away from fixed contact 15 and engage fixed contact 13. A circuit will thus be completed from battery 14 through the closed contacts 13, 16 of relay 12, lead 18, closed contacts 19, 22 of relay 21 to lead 32 and thence through lead 43 to lead 65 at the subscriber's station, to electrode 64 of gas tube 63. As the battery voltage will be applied across electrodes 62, 64 of tube 63, the gas therein will ionize and current will flow through the coil 61 of relay 57 to ground. Energization of relay 57 will effect closing of its contacts 58, 59 to cause the secondary clock 56 to be synchronized with the master clock in conventional manner.

During normal use of the telephone, when the subscriber lifts the handset 41, for example, from the cradle, switch 46 will close to complete a circuit from battery 28 at the central station through the coil 20 of line relay 26, the normally closed contacts 24, 25 of cut-off relay 21, lead 33 to lead 44 thence through closed contacts 48, 51 of switch 46, handset 41, closed contacts 49, 47, lead 43 to lead 32, normally closed contacts 22, 19 of cut-off relay 21, through normally closed contacts 16, 15 of relay 17 to ground.

As a result, relay 26 at the central station will be energized to close its contacts 27, 29 to complete a circuit from battery 28 to lamp 31. Illumination of lamp 31 in the case of a manual exchange will indicate to the operator that a subscriber is calling. The operator will answer the subscriber 41 by inserting the plug 66 into jack 36 and throwing a conventional switch (not shown) to connect the headset of the operator to the handset 41. Engagement of contact 69 of plug 66 with sleeve contact 37 of jack 36 will complete a circuit from battery 73, through lamp 72, closed contacts 69, 37, lead 40, through the coil 23 of cut-off relay 21 to ground. As a result, lamp 72 will be illuminated to indicate that the calling subscriber's line is being answered and relay 21 will be energized to open contacts 19, 22 and 24, 25. Openings of the contacts 24, 25 will de-energize relay 26 and lamp 31 will go out to indicate that the subscriber is being attended to.

To connect the subscriber 41 to the subscriber 41' being called, the operator will insert the plug 66' associated with the subscriber 41 who is calling, into the jack 36' associated with the subscriber 41' being called and will operate switch 76' to connect contacts 75' and 82'. As a result, ringing current will flow from the ringing generator 84', through contacts 75', 82' of switch 76', contact 68', and the contact of jack 36' corresponding to contact 35 of jack 36, lead 44' to the ringer (not shown) associated with handset 41'.

So long as a subscriber's line is busy, and the jack 36, for example, is engaged by the plug 66, the cut-off relay 21 will be energized and hence as contacts 19, 22 are open, even if a synchronization impulse should be transmitted by the master clock 11, it would not pass through the open contacts 19, 22 and hence would not affect the headset 41 with resultant annoying noise to the subscriber and possible damage to the headset 41.

The synchronization system involves substantially no modification of the conventional telephone circuit which might cause ringing current to affect the handset 41.

The use of the gas tube 63 in the synchronization circuit provides an open circuit when the tube 63 is not ionized, ensuring that the subscriber's lines will be retained above ground during normal operation and hence the synchronization system will not interfere with trouble shooting at the central station in case of faults in the telephone system.

Although the synchronization system has been shown and described with respect to a manual exchange, it is of course understood that it could as readily be applied to an automatic exchange.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A synchronization system for clocks comprising a plurality of subscribers' stations, a telephone central station, telephone lines between said subscribers' stations and said central station, a subscriber's clock having associated synchronization means connected to said telephone line at each of said subscribers' stations, a master clock at said central station, a relay actuated by said master clock to control transmittal of synchronization impulses, a cut-off relay at said central station electrically connected between the synchronization relay and each of the subscribers' lines, a talking circuit at said central station, means to connect two of said subscribers' lines through said talking circuit, and means to energize said cut-off relay when a subscriber's line is connected to the talking circuit, to restrain further transmittal of synchronization impulses to said subscriber's line.

2. A synchronization system for clocks comprising a subscriber's station, a telephone central station, a master clock at said central station, a relay actuated by said master clock to control transmittal of synchronization impulses, a subscriber's telephone line between said stations, a subscriber's clock having associated synchronization means connected to said telephone line at said subscriber's station, said synchronization means for said subscriber's clock comprising a relay having a coil and a gas tube electrically connected between said coil and said subscriber's line whereby when a synchronization impulse is transmitted through said subscriber's line, said gas tube will conduct to effect energization of said relay to synchronize said subscriber's clock, a cut-off relay at said central station associated with said subscriber's station and electrically connected between the synchronization relay and the subscriber's line, a talking circuit at said central station, means to connect said talking circuit to said subscriber's line and means to energize said cut-off relay when talking circuit is connected to said subscriber's line to restrain further transmittal of synchronization impulses to said subscriber's line.

3. The combination set forth in claim 2 in which said impulse relay has a pair of fixed contacts and a contact arm normally engaging one of said contacts and spaced from the other, said latter contact being connected to a source of potential.

4. The combination set forth in claim 2 in which said cut-off relay has a pair of normally closed contacts, one of said contacts being connected to said subscriber's line, and said impulse relay has a pair of fixed contacts and a contact arm normally engaging one of said contacts and connected to the other contact of said cut-off relay, said other contact of said impulse relay being connected to a source of potential.

5. The combination set forth in claim 2 in which said cut-off relay has two pairs of normally closed contacts, said telephone line has a pair of leads, one of the contacts of each of said pairs of contacts being connected respectively to said leads, a line relay at said central station having a coil connected to the other contact of one of said pairs of contacts and to one side of a source of potential, an indicator controlled by said line relay, said impulse relay having a pair of fixed contacts, one of said fixed contacts being connected to the other side of said source of potential and a contact arm normally engaging said fixed contact connected to the other side of said source of potential and connected to the other contact of the other of said pair of contacts of said cut-off relay, said other fixed contact of said impulse relay being connected to a source of potential, and a normally open switch at said subscriber's station controlling the circuit between said line relay and the associated source of potential.

No references cited.